United States Patent Office 3,702,879
Patented Nov. 14, 1972

3,702,879
BIS-(p - HYDROXYPHENYL) ALKYL-PHOSPHONIC ACID ESTERS, PROCESS FOR PREPARING THE SAME
Hellmut F. I. Bredereck, 140 Zeppelin St., 7000 Stuttgart, Germany; Miltiadis I. Iliopulos, 1503 28th St., Vienna, W. Va. 26101; and Horst F. Wieder, 2300 Amy Ave., Kingsport, Tenn. 37664
No Drawing. Continuation-in-part of application Ser. No. 471,465, July 12, 1965. This application Jan. 14, 1970, Ser. No. 2,938
Int. Cl. C07f 9/40; C08g 17/13; A01n 9/36
U.S. Cl. 260—953
9 Claims

ABSTRACT OF THE DISCLOSURE

Bis-(p-hydroxyphenyl) alkyl phosphonic acid esters are prepared by reacting a phenol (or a mono- or di-substituted phenol) with an α-ketophosphonic acid diester in the presence of a Lewis acid. The Lewis acid may also be complexed with either or both of the reactants prior to or during the reaction. The phosphonic acid diesters produced are novel compounds and are useful intermediates in the production of novel derivatives and polymers.

CROSS REFERENCE TO RELATED PATENT APPLICATION

This application is a continuation-in-part of copending patent application Ser. No. 471,465 filed July 12, 1965, now abandoned.

BACKGROUND OF THE INVENTION

Field of the invention

This invention relates to novel phosphorus containing organic compounds and to a proces for their preparation. In particular, this invention is concerned with the preparation of novel bis-(p-hydroxyphenyl) alkyl phosphonic acid diesters which are useful intermediates in the preparation of polymers and derivatives.

Description of the prior art

Substituted phenols are known to condense with ketones in the presence of strong acids such as sulfuric acid to produce bisphenols. This reaction, however, does not take place between phenols or substituted phenols and α-ketophosphonates. Angewandte Chemie (International edition in English), vol. 4, 1965, No. 7, pp. 592–593, a publication by the inventors of this application, reports that attempts to condense substituted phenols with α-ketophosphonates in the presence of sulfuric or hydrochloric acid results in the ketophosphonate being split into a carboxylic acid and a dialkyl phosphite with no condensation taking place. No condensation takes place with polyphosphoric acid.

SUMMARY OF THE INVENTION

This invention relates to novel phosphorus containing organic compounds and to a novel process for their preparation.

The compounds of this invention are represented by the following general structural formula:

(1) 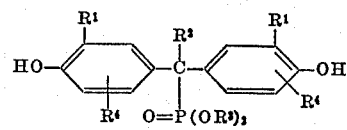

wherein $R^1$ represents an atom of hydrogen, or halogen, e.g. Cl, Br, F, or I, hydroxy, alkyl e.g. $CH_3$, $C_2H_5$, $C_3H_7$, $C_5H_{11}$, $C_6H_{13}$, $C_7H_{15}$, $C_8H_{17}$, $C_9H_{19}$, $C_{10}H_{21}$, $C_{15}H_{31}$, $C_{20}H_{41}$, etc. $R^4$ represents an atom of hydrogen, or halogen, e.g. Cl, Br, F, or I, hydroxy, alkyl, e.g. $CH_3$, $C_2H_5$, $C_3H_7$, $C_6H_{13}$, $C_8H_{17}$, $C_{15}H_{31}$, $C_{20}H_{41}$, etc. cycloalkyl, e.g. $cyC_4H_7$, $cyC_5H_9$, $cyC_6H_{11}$, etc. arylalkyl, e.g. $C_6H_5CH_2$, $$C_6H_5C_2H_4,\ C_6H_5C_{18}H_{36}$$

$C_{10}H_7CH_2$, $C_{10}H_7C_2H_4$, $C_{10}H_7C_{16}H_{32}$, etc. or aryl, e.g. phenyl, naphthyl, anthryl, phenanthryl, etc. which may or may not be substituted with substituents inert under the conditions or preparation, e.g. Cl, Br, F, I or hydrocarbon substituents; and $R^2$ and $R^3$ are alkyl, e.g. $CH_3$, $C_2H_5$, $C_3H_7$, $C_4H_9$, $C_5H_{11}$, $C_6H_{13}$, $C_7H_{15}$, $C_8H_{17}$, $C_9H_{19}$, $C_{10}H_{21}$, $C_{15}H_{31}$, $C_{20}H_{41}$, etc. cycloalkyl, e.g. $cyC_4H_7$, $cyC_5H_9$, $cyC_6H_{11}$, etc. arylalkyl, e.g. $C_6H_5CH_2$, $C_6H_5C_2H_4$, $C_6H_5C_{18}H_{36}$, $C_{10}H_7CH_2$, $C_{10}H_7C_2H_4$, $C_{10}H_7C_{16}H_{32}$, etc. or aryl, e.g. phenyl, naphthyl, anthryl, phenanthryl, etc. which may or may not be substituted with substituents inert under the conditions or preparation, e.g. Cl, Br, F, or I, or hydrocarbon substituents. When $R^1$, $R^2$, $R^3$, and/or $R^4$ are aliphatic, they may be straight- or branched-chain, and may be substituted or contain substituents such as halogen, viz Cl, Br, I, or F. The radicals $R^1$, $R^2$, $R^3$, and $R^4$ may be the same or different.

The novel process for preparing compounds of the general structural Formula 1 is one in which a compound of the general formula (2)

$$R^2-\underset{\underset{}{\overset{O}{\|}}}{C}-\underset{\underset{OR^3}{}}{\overset{\overset{O}{\|}}{P}}\diagdown OR^3$$

in which $R^2$ and $R^3$ are as defined in Formula 1 above is reacted in the presence of a non-protonic Lewis acid such as $AlCl_3$, $ZnCl_2$, $SnCl_4$, $TiCl_4$, $SO_3$, boron halides viz $BF_3$, $BI_3$, $BCl_3$, $BBr_3$, etc. with a compound of the general formula (3)

$$HO-\!\!\!\left\langle\!\!\begin{array}{c}R^1\\\\R^4\end{array}\!\!\right\rangle$$

in which $R^1$ and $R^4$ are as defined in Formula 1 above.

It has also been found in accordance with this invention that the same final products are obtained, if Compound 2 or Compound 3 is reacted with the Lewis acid to form a coordination compound and the resulting coordination compound then reacted with the other reactant. Thus, a coordination compound of a boron halide with Compound 2 may be reacted with Compound 3 or a coordination compound of a boron halide with Compound 3 may be reacted with Compound 2.

Compounds of the general Formula 2 are known in the art or can be made by known methods, for example, by reacting a carboxylic acid halide of the formula (4) 

where Hal is halogen, viz chlorine, bromine, fluorine, or iodine, and $R^2$ is a radical as defined in Formula 1 above, with a tertiary phosphite of the formula (5) $(R^3O)_3P$ or with a metal derivative of a secondary ester of phosphorus acid of the formula (6) 

(Me=an atom of metal)

in which $R^3$ in the Formulas 5 and 6 is as defined in Compound 1 above. The radicals $R^3$ may be the same or different in Formulas 5 and 6, although the unsymmetrical compounds are more difficult to make.

The reaction, whether between Compounds 2 and 3 in the presence of a Lewis acid or of a Lewis acid coordination compound with one of the Compounds 2 or 3 with the other of the reactant compounds is often exothermic so that, if desired, it may be necessary to bring the reactants together while cooling. The reaction should be carried out at the lowest reasonable temperature, preferably not above 60 deg. C., since side reactions increase in magnitude with temperature. It is assumed that the products of these side reactions include different isomers, such as 2,4'-dihydroxy-diphenyl-alkylphosphonates.

In order to obtain a high yield of the condensation products, a molar ratio of the phenol or the substituted phenol of Compound 3 to the 1-ketophosphonate of Compound 2 should be at least 3:1. It has also been found that derivatives of the resulting products may be prepared by chemical conversion of the hydroxyl groups in the final products, e.g. by esterification or etherification.

Depending on their constitution the products of this invention are high melting crystalline solids. They are soluble in various organic solvents such as alcohols, benzene, chlorinated hydrocarbons, acetone and cyclic ethers. They can be used as intermediate products for a very wide variety of purposes. As having at least two functional groups they can be used as inexpensive starting materials for the preparation of fire resistant condensation homopolymers and copolymers. Such polymers can be obtained by the polycondensation of the novel compounds of this invention with various other bifunctional compounds. Typical examples of such polymers are polycarbonates and mixed polycarbonates, polyesters, polyethers, and polyamides. The monomers of this invention can also be reacted with monobasic saturated or unsaturated acids, or with their derivatives to produce esters, that are useful for example as plasticisers; furthermore, suitably substituted compounds of the structural Formula 1 can be used advantageously as biological toxicants, e.g. as insecticides, fungicides and nematocides.

DESCRIPTION OF THE PREFERRED EMBODIMENTS

The following examples illustrate in detail the preparation of various novel bis-(p-hydroxyphenyl) alkyl phosphonic acid esters and some of their derivatives in accordance with the novel process comprising this invention. The examples also illustrate the preparation of some useful derivatives of the novel products of this invention.

The following non-limiting examples are therefore illustrative of the scope of this invention:

Example 1

Into a 100 ml. three necked flask equipped with a reflux-condenser open at the top, a mechanical stirrer, thermometer, dropping funnel and a gas addition tube was charged 11.3 grams (0.12 mole) of phenol. With stirring boron fluoride was bubbled through until saturation occurred, while the temperature was held at 20–30 deg. C. by external cooling. Through the dropping funnel and over a period of 30 minutes while stirring and cooling was added dropwise 3.04 grams (0.02 mole) of dimethylacetylphosphonate. The reaction mixture was heated while stirring was continued at 40 deg. C. for one half hour. The crude product was a high viscous yellowish colored liquid. It was dissolved in about 25 ml. of glacial acetic acid and the resulting solution was poured into a liter of water. The resulting suspension was allowed to stand overnight at room temperature. The crystalline product was collected on a sinter glass funnel; it was recrystallized from hot dioxane by adding water to the cloud point and cooling the solution to 5 deg. C. (1)-bis-(p-hydroxyphenyl) ethylphosphonic acid dimethylester of the formula

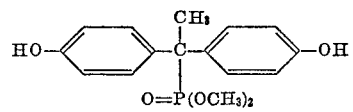

melting at 217 deg. C. was obtained. The yield of the pure compound was 5.1 grams (79%).

*Analysis.*—Calcd. for $C_{16}H_{19}O_5P$ (percent): C, 59.62; H, 5.94; P, 9.61. Found (percent): C, 59.41; H, 5.98; P, 9.70 (flame photometry). Infrared analysis confirmed the structure of the compound.

Example 2

A mixture of 25.7 grams (0.2 mole) of O-chlorophenol and 5.1 grams (0.033 mole) of dimethylacetylphosphonate is placed in the above described apparatus. The mixture is cooled at 15 deg. C. by external cooling. While maintaining this temperature by cooling, boron fluoride is bubbled through the mixture with good agitation until no more boron fluoride is absorbed. Thereafter the mixture is heated at 50 deg. C. for one half hour and the resulting high viscous liquid is dissolved in 15 ml. of glacial acetic acid. This solution is then poured into 1.5 liters of water and the resulting emulsion is allowed to stand for 24 hours at room temperature during which time it deposits a substantially quantitative yield of a white solid melting at 211–212 deg. C.; the latter is recrystallized from a mixture of methanol and water and is then found to melt at 213.5–214 deg. C. The overall yield of the pure (1)-bis-(3-chloro-4-hydroxyphenyl) ethylphosphonic acid dimethylester of the formula

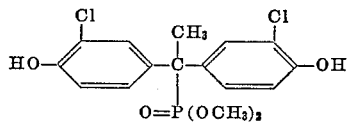

is 81% proving the crude to be of high purity.

*Analysis.*—Calcd. for $C_{16}H_{17}Cl_2O_5P$ (percent): C, 49.13; H, 4.38; P, 7.91. Found (percent): C, 49.22; H, 4.68; P, 7.78 (flame photometry).

Example 3

Using the glass apparatus described in Example 1, 11.3 grams (0.12 mole) of phenol was saturated with boron fluoride under cooling. To this mixture 4.28 grams (0.02 mole) of dimethylbenzoylphosphonate was added dropwise while the temperature was held at 40 deg. C. by external cooling. The highly viscous reaction mixture was heated for one hour at 50 deg. C. with stirring. The product was then dissolved in 20 ml. of glacial acetic acid and the resulting solution was poured in one liter of water. The suspension was allowed to stand overnight at room temperature during which time it deposited a quantitative yield of a solid. The latter was recrystallized from a dioxane petroleum ether mixture. The yield of pure (1) - bis - (p - hydroxyphenyl)-1-(phenyl)-methylphosphonic acid dimethylester of the formula

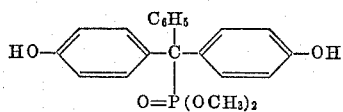

was 6.9 grams (90%). Decomposition point 273–274 deg. C.

*Analysis.*—Calcd. for $C_{21}H_{21}O_5P$ (percent): C, 65.62; H, 5.51. Found (percent): C, 65.85; H, 5.51.

Example 4

In an apparatus similar to that described in Example 1, 12.0 grams (0.066 mole) of diethyl-1-ketoethanephosponate was saturated with boron fluoride while the temperature was held at 15 deg. C. by external cooling. While stirring and cooling 18.82 grams (0.2 mole) of phenol was added portion-wise to this reaction product. After the reaction was complete the crude product was heated for one hour at 50 deg. C. It was then dissolved in 20 ml. of glacial acetic acid and poured into 2 liters of water. After 24 hours a crystalline product was obtained. A part of the crude product was recrystallized from hot methanol by adding water to the cloud point while another part was recrystallized from an ethylacetate/petroleum ether mixture. The overall yield of pure (1)-bis-(p-hydroxyphenyl) ethylphosphonic acid diethylester of the formula

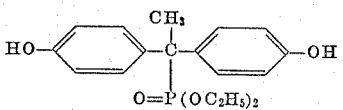

was 12.3 grams (53%). The white crystalline product melts at 159–160 deg. C.

*Analysis.*—Calcd. for $C_{18}H_{23}O_5P$ (percent): C, 61.71; H, 6.62. Found (percent): C, 61.62; H, 6.47.

Example 5

Four and two tenths grams (0.013 mole) of (1)-bis-(p-hydroxyphenyl) ethylphosphonic acid dimethylester was placed in a 100 ml. round-bottomed flask equipped with reflux condenser. 15 ml. (0.161 mole) of acetic anhydride and 1.5 grams (0.018 mole) of anhydrous sodium acetate were then added. The suspension was heated on a steam bath for two hours with occasional shaking. The resulting solution of the compound formed was then cooled to room temperature and poured into 100 grams of cracked ice. The crude crystalline solid was recrystallized from a mixture of isopropanol and water. The yield of pure (1)-bis-(p-acetoxyphenyl) ethyl dimethylphosphonate of the formula

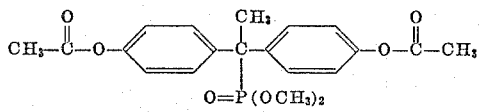

was 4.3 grams (80%).

*Analysis.*—Calcd. for $C_{20}H_{23}O_7P$ (percent): C, 59.10; H, 5.71. Found (percent): C, 59.39; H, 5.70.

Example 6

Employing the apparatus and the procedure described in the preceding example, 5.08 grams (0.013 mole) of (1)-bis-(3-chloro-4-hydroxyphenyl) ethylphosphonic acid dimethylester was reacted with 15 ml. (0.161 mole) of acetic anhydride in the presence of 1.5 grams (0.018 mole) of anhydrous sodium acetate. The crude material was recrystallized from a mixture of benzene and petroleum ether. There were obtained 4.0 grams (64.8% yield) of (1)-bis-(3-chloro-4-acetoxyphenyl) ethyldimethylphosphonate of the formula

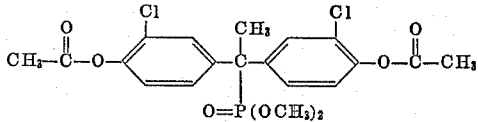

melting at 92 deg. C.

*Analysis.*—Calcd. for $C_{20}H_{21}Cl_2O_7P$ (percent): Cl, 14.92; P, 6.52. Found (percent): Cl, 15.16; P, 6.51.

Example 7

Using the glass apparatus described in Example 1, 3.20 grams (0.04 mole) of liquid sulfur trioxide (99.5%) was added with stirring over a half hour period to 6.08 grams (0.04 mole) of fresh distilled dimethyl-1-ketoethanephosphonate while the temperature was maintained between −5 deg. and 0 deg. C. by external cooling. The formed sufur trioxide adduct was then warmed to a temperature of from about 20 deg. to 30 deg. C. and then stirring continued for 15 minutes. While stirring and cooling 22.56 grams (0.24 mole) of phenol was added portion-wise to this adduct. After the reaction was complete the resulting viscous reaction mixture was heated with stirring for one half hour at 40 deg. C. It was then dissolved in 20 ml. of glacial acetic acid and the resulting solution was poured in two liters of water. After 48 hours a crystalline product was obtained. It was recrystallized from hot methanol by adding water to the cloud point. (1) - bis - (p-hydroxyphenyl)-ethylphosphonic acid dimethylester melting at 217 deg. C. was obtained. The yield of the pure compound was 5.60 grams (49.6%).

*Analysis.*—Calcd. for $C_{16}H_{19}O_5P$ (percent): C, 59.62; H, 5.94; P, 9.61. Found (percent): C, 59.94; H, 6.15; P, 9.68 (flame photometry). The infrared spectrum of this product is identical with the infrared spectrum of the compound described in Example 1.

Examples 8–19

A series of additional experiments were carried out which are tabulated below in Table I. These experiments illustrate the variation in the order of addition of reactants and in the use of different Lewis acid catalysts. The examples in the table illustrate the use of a variety of reactants and Lewis-acid catalysts and the products are characterized by melting point or decomposition temperature. The footnote following Table 1 indicates the method of preparation used in the various examples tabulated.

TABLE I

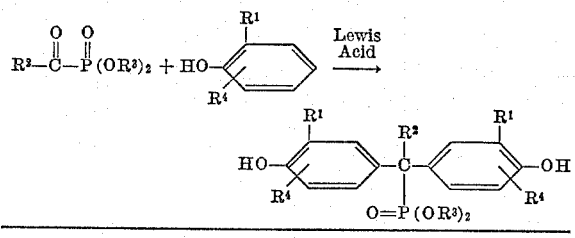

| Example No. | $R^1$ | $R^2$ | $R^3$ | $R^4$ | Lewis acid | Method of preparation | M.P. product, °C. |
|---|---|---|---|---|---|---|---|
| 8 | H | $CH_3$ | $CH_3$ | H | $SO_3$ | D | 217 |
| 9 | H | $CH_3$ | $C_2H_5$ | H | $SO_3$ | E | 159 |
| 10 | Cl | $CH_3$ | $CH_3$ | H | $BF_3$ | A | 214 |
| 11 | Cl | $CH_3$ | $CH_3$ | H | $SO_3$ | D | 214 |
| 12 | Cl | $CH_3$ | $C_2H_5$ | H | $BF_3$ | A | 144 |
| 13 | Cl | $C_6H_5$ | $C_2H_5$ | H | $BF_3$ | C | a 209 |
| 14 | $CH_3$ | $CH_3$ | $CH_3$ | H | $BF_3$ | C | 212 |
| 15 | H | $CH_2Cl$ | $CH_3$ | H | $BF_3$ | C | a 158 |
| 16 | H | $CH_2Cl$ | $C_2H_5$ | H | $BF_3$ | C | a 142 |
| 17 | H | $C_6H_5$ | $C_2H_5$ | H | $BF_3$ | B | a 226 |
| 18 | Cl | $C_6H_5$ | $C_2H_5$ | H | $BF_3$ | A | a 263–4 |
| 19 | H | $CH_3$ | H | H | $SO_3$ | F | a 254 | a Decomposition.

Methods of preparation: A. Phenol-BF₃ complex ketophosphonate; B. Ketophosphonate-BF₃ complex+Phenol; C. Phenol+Ketophosphonate+BF₃; D. Ketophosphonate−SO₃ complex+Phenol; E. Ketophosphonate+Phenol+SO₃; F. Acid hydroylsis of product of Example 8.

Examples 20-42

Examples 20-42 set forth in Table II below illustrate the preparation of a large variety of compounds by the method of this invention and demonstrate the effect of variation in substituents on each of the reactants and also the use of different Lewis acid catalysts. The method of preparation indicated in Table II is described further in the footnotes following the table. The process used is one in which the reactants are mixed in the presence of a Lewis acid catalyst or the Lewis acid catalyst is complexed with one of the reactants and the resulting complex reacted with the other reactant. The process is otherwise generally as described in the previous examples.

of 4.0 grams (0.0124 mole) of (1)-bis-(p-hydroxyphenyl) ethylphosphonic acid dimethylester in 50 ml. of 0.75 normal caustic soda, 25 ml. of dichlormethane and 0.25 gram (0.00645 mole) of triphenylbenzylphosphonium chloride as catalyst. Under good agitation gaseous phosgene was bubbled through until the stoichiometric quantity corresponding to the phosphonate was achieved. During the addition of phosgene, the temperature of the mixture was maintained at 25-26 deg. C. by external cooling. The pH should be maintained above 10 throughout the reaction. After the reaction was completed the organic phase was washed with water until free of salt and alkali. Then the solution of the polymer was poured in water of 60-70

TABLE II

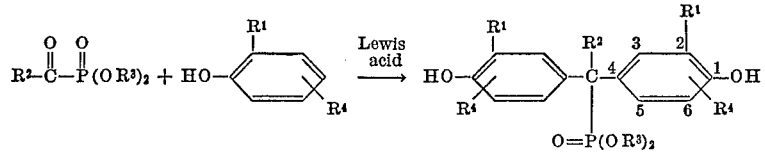

| Ex. No. | $R^1$ | $R^2$ | $R^3$ | $R^4$ | Lewis acid | Method of preparation |
|---|---|---|---|---|---|---|
| 20 | $CH_3$ | $n$-$C_3H_7$ | $CH_3$ | H | $AlCl_3$ | C |
| 21 | H | $n$-$C_4H_9$ | $n$-$C_8H_{17}$ | H | $ZnCl_2$ | C |
| 22 | $CH_3$ | $n$-$C_4H_9$ | $-CH_2CH_2Cl$ | H | $SnCl_4$ | C |
| 23 | $t$-$C_4H_9$ | $n$-$C_6H_{13}$ | Cl-C₆H₄- | H | $TiCl_4$ | C |
| 24 | H | H-C₆H₄-CH₂ | $BrC_6H_4$ | H | $BCl_3$ | C |
| 25 | $CH_3$ | C₆H₅ | H-C₆H₄ | $CH_3$ [a] | $BF_3$ | C |
| 26 | H | 3,4-Cl₂-C₆H₃ | $-CH_2-CH_2-Cl$ | H | $BF_3$ | C |
| 27 | Sec-$C_4H_9$ | $CH_3$ | F-C₆H₄- | H | $BF_3$ | A |
| 28 | $t$-$C_4H_9$ | $CH_2Cl$ | $-C_2H_4Cl$ | $C_2H_5$ | $SO_3$ | C |
| 29 | Cl | $CH_3$ | $C_2H_5$ | Cl [a] | $BF_3$ | B |
| 30 | Br | $CH_3$ | $C_{18}H_{37}$ | Br [a] | $SO_3$ | B |
| 31 | H | $CH_3$ | $CH_3$ | H-C₆H₄ [a] | $BF_3$ | A |
| 32 | H | Cl-C₆H₄-CH₂ | C₆H₅-CH₂ | H | $SO_3$ | B |
| 33 | H | F-C₆H₄-CH₂ | $C_2H_5$ | H | $BF_3$ | B |
| 34 | $CH_3$-$CH_2$-$CH_2$- | $CH_3$ | $CH_3$ | $CH_3$ [a] | $SO_3$ | B |
| 35 | $CH_3$ | $-CH_2-CH_2Cl$ | $CH_3$ | $CH_3$ [a] | $BF_3$ | A |
| 36 | $CH_3$ | $CH_3$ | $CH_3$ | $-CH_2-CH_2Cl$ | $SO_3$ | B |
| 37 | I | $CH_3$ | $CH_3$ | I [a] | $BF_3$ | B |
| 38 | $CH_3$ | $CH_3$ | $CH_3$ | C₆H₄-CH₂- [a] | $SO_3$ | B |
| 39 | $CH_3$ | $CH_3$ | $CH_3$ | C₆H₅ [a] | $BF_3$ | A |
| 40 | $CH_2Cl$ | $CH_3$ | $CH_3$ | $-CH_2Cl$ [a] | $SO_3$ | B |
| 41 | $CCl_3$ | $CH_3$ | $CH_3$ | H | $BF_3$ | A |
| 42 | $CF_3$ | $C_2H_5$ | $C_2H_5$ | H | $BF_3$ | B |

[a] At $C_4$ position.

Methods of preparation: A. Phenol-Lewis acid complex + ketophosphonate; B. Phenol + Ketophosphonate-Lewis acid complex; C. Phenol + Ketophosphonate + Lewis acid.

Example 43

Typical homopolycondensates containing the novel phosphonates. Preparation of phosphorus containing polycarbonates using the interfacial polycondensation technique.

Into a 250 ml. four-necked flask equipped with a powerful stirrer, a reflux condenser with an outlet tube, a glass electrode and a gas-addition tube were placed a solution deg. C. By this operation the dichlormethane evaporates and the polycarbonate of the structural formula

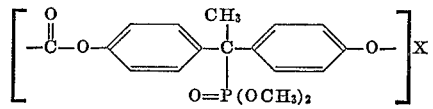

is collected and dried at 100 deg. C. under high vacuum. Yield 95-100%. Its intrinsic viscosity was found to be 0.038 g./l. which corresponds to a molecular weight of 16,000. Its phosphorus content was found to be 8.94% (flame photometry). Sheets of this material (0.085–0.090 mm. thick) are self-extinguishing.

Example 44

Employing the apparatus and the technique described in the preceding example, 4.83 grams (0.015 mole) of (1)-bis-(p-hydroxyphenyl) ethylphosphonic acid dimethylester and 3.42 grams (0.015 mole) of bisphenol A were dissolved in 100 ml. of 0.80 normal caustic soda. Then 50 ml. of dichloromethane and 0.5 gram (0.00128 mole) of triphenylbenzylphosphonium chloride were added. The reaction with phosgene was carried out in the same manner as described in Example 43. The yield of the obtained polymer was 95–100%. Its intrinsic viscosity—using a solution of the polymer in dichloromethane—was found to be 0.048 g./l. This value corresponds to an average molecular weight of 21,000. The degree of flame resistance and the physical properties of the mixed polycarbonate can be altered extensively by varying the amounts of the reactants.

The compounds prepared in accordance with this invention are obtained generally in high yield and are inexpensive starting materials for the preparation of fire resistant polymers and copolymers which are useful in sheet or film form as structural or packaging materials and which may be formed in a manner similar to other synthetic resins. As noted above, the compounds prepared in accordance with this invention may be reacted with phosgene to prepare polycarbonate resins having a high phosphorus content. These compounds may also be reacted with polyisocyanates to prepare polyurethane materials having a high phosphorus content.

We claim:

1. Organic phosphorus compounds of the formula

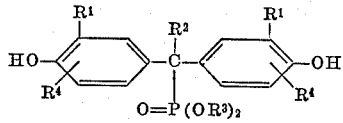

wherein $R^1$ is hydrogen, halogen, alkyl, or haloalkyl, $R^2$ is alkyl, haloalkyl, cycloalkyl, halocycloalkyl, arylalkyl, haloarylalkyl, aryl, or haloaryl; $R^3$ is hydrogen, alkyl, haloalkyl, alkenyl, cycloalkyl, halocycloalkyl, arylalkyl, haloarylalkyl, aryl, or haloaryl; $R^4$ is hydrogen, halogen, hydroxy, alkyl, haloalkyl, cycloalkyl, halocycloalkyl, arylalkyl, haloarylalkyl, aryl, or haloaryl; and said R groups contain up to 26 carbon atoms.

2. A compound as defined in claim 1 in which $R^1$ and $R^4$ are hydrogen, and $R^2$ and $R^3$ are methyl.

3. A compound as defined in claim 1 in which $R^1$ is Cl, $R^2$ and $R^3$ are methyl, and $R^4$ is hydrogen.

4. A compound as defined in claim 1 in which $R^1$ and $R^4$ are hydrogen, $R^2$ is phenyl, and $R^3$ is methyl.

5. A compound as defined in claim 1 in which $R^1$ and $R^4$ are hydrogen, $R^2$ is methyl, and $R^3$ is ethyl.

6. A process for producing compounds having the structural formula of claim 1 which comprises contacting a 1-ketophosphonate with a phenol to cause a reaction therebetween in the presence of a Lewis acid at a temperature less than 70 deg. C.

7. A process as defined in claim 6 in which the Lewis acid is complexed with one of the reactants and the complex mixed with and reacted with the other reactant.

8. A process as defined in claim 6 in which the reaction is carried out at a temperature of about −60 deg. to about 70 deg. C. and a phenol/1-ketophosphonate molar ratio of at least about 3:1.

9. A process as defined in claim 7 in which the reaction is carried out at a temperature of about −60 deg. to +70 deg. C. and a phenol-Lewis acid complex/1-ketophosphonate or a phenol/1-ketophosphonate-Lewis acid complex molar ratio of at least about 3:1.

No references cited.

LEWIS GOTTS, Primary Examiner
A. H. SUTTO, Assistant Examiner

U.S. Cl. X.R.

260—2 P, 30.6 R, 47 XA, 951, 952, 968, 969, 970; 424—217